(12) United States Patent
Brydon et al.

(10) Patent No.: US 7,702,724 B1
(45) Date of Patent: Apr. 20, 2010

(54) WEB SERVICES MESSAGE BROKER ARCHITECTURE

(75) Inventors: Sean P. Brydon, Berkeley, CA (US); Inderjeet Singh, Milpitas, CA (US)

(73) Assignee: Oracle America, Inc., Santa Clara, CA (US)

( * ) Notice: Subject to any disclaimer, the term of this patent is extended or adjusted under 35 U.S.C. 154(b) by 1667 days.

(21) Appl. No.: 10/854,885

(22) Filed: May 27, 2004

(51) Int. Cl.
*G06F 15/16* (2006.01)
*G06F 15/173* (2006.01)

(52) U.S. Cl. ...................... 709/203; 709/224
(58) Field of Classification Search ................ 709/203, 709/206, 213, 219, 224, 230
See application file for complete search history.

(56) References Cited

U.S. PATENT DOCUMENTS

| | | | |
|---|---|---|---|
| 6,477,580 B1 | 11/2002 | Bowman-Amuah | |
| 6,578,068 B1 | 6/2003 | Bowman-Amuah | |
| 6,757,899 B2 * | 6/2004 | Zhdankin et al. | 719/315 |
| 6,792,605 B1 * | 9/2004 | Roberts et al. | 719/313 |
| 7,366,781 B2 * | 4/2008 | Abjanic | 709/227 |
| 2002/0013739 A1 * | 1/2002 | O'Donnell et al. | 705/26 |
| 2002/0013759 A1 * | 1/2002 | Stewart et al. | 705/37 |
| 2002/0032790 A1 * | 3/2002 | Linderman | 709/230 |
| 2002/0059425 A1 * | 5/2002 | Belfiore et al. | 709/226 |
| 2002/0099738 A1 * | 7/2002 | Grant | 707/513 |
| 2004/0205613 A1 * | 10/2004 | Li et al. | 715/523 |
| 2004/0254993 A1 * | 12/2004 | Mamas | 709/206 |
| 2005/0044197 A1 * | 2/2005 | Lai | 709/223 |
| 2005/0050173 A1 * | 3/2005 | Kikuchi | 709/219 |

OTHER PUBLICATIONS

"LearnIT: Web Services," SearchWebServices.com Definitions, http://searcwebservices.techtarget.com/sDefinition/o,,sid26_gci934542,00.html, Dec. 2, 2003,(6 pages).
"Web services," Search WebServices.com Definitions, http://searcwebservices.techtarget.com/sDefinition/o,,sid26_gci750567,00.html, Nov. 12, 2001,(3 pages).
"Market Analysis," Search WebServices.com Definitions, http://searcwebservices.techtarget.com/originalcontent/o,289142,sid26_gci874060,,00.html, Jan. 14, 2003, (5 pages).
"The Web Services Advisor," Web Services Tips & Newsletter, http://searcwebservices.techtarget.com/tip/1,289483,sid26_gci9788326,00.html, Jan. 22, 2002, (4 pages).

(Continued)

*Primary Examiner*—Jeffrey Pwu
*Assistant Examiner*—Gerald Smarth
(74) *Attorney, Agent, or Firm*—Robert C. Kowert; Meyertons, Hood, Kivlin, Kowert & Goetzel, P.C.

(57) ABSTRACT

A web services message broker architecture. In one embodiment, a system may include a server system and a plurality of applications, each configured to implement one or more enterprise functions and to execute on the server system. The system may further include a web services message broker configured to execute on the server system and to present a central web services interface to the plurality of applications, through which a given one of the plurality of applications is configured to communicate with a web service. In one specific implementation of the system, the web services message broker may be further configured to receive an incoming web service request and to convey the incoming web service request to one of the plurality of applications.

33 Claims, 5 Drawing Sheets

OTHER PUBLICATIONS

"Web Services-Building Blocks," Web Services Tips & Newsletter, http://searcwebservices.techtarget.com/tip/1,289483,sid26_gci777537,00.html, Oct. 24, 2001, (4 pages).

"The Web Services Advisor," Web Services Tips & Newsletter, http://searcwebservices.techtarget.com/tip/1,289483,sid26_gci811272,00.html, Mar. 26, 2002, (5 pages).

"We Services Architecture," W3C Working Group Note Feb. 11, 2004, http//www.w3.org/TR/2004/NOTE-ws-arch-20040211/, (98 pages).

Ray Lai, "J2EE Platform Web Services," Sun Microsystems Press, 2003.

* cited by examiner

WEB SERVICES MESSAGE BROKER ARCHITECTURE

BACKGROUND OF THE INVENTION

1. Field of the Invention

This invention relates to computer systems and, more particularly, to web services communication among computer systems.

2. Description of the Related Art

As enterprises increase their use of information technology solutions to manage various enterprise functions, and with the promulgation of various Internet standards for communicating between computer systems, demand for techniques to facilitate the exchange of information and services across enterprises (or within large, decentralized enterprises) has also increased. For example, the World Wide Web (or simply, the web) has become a common portal for selling products and services to end consumers. However, in some early web-storefront implementations, only the order-entry process was automated by the web application; in some instances, web-entered orders were simply printed out while the order fulfillment process (including steps such as payment verification, order picking/supplier provisioning, and order delivery) was conducted manually.

Over time, as enterprises and their partners automated their business processes and increased their Internet presence, the possibility to extend such automation to interfaces between dissimilar applications or enterprises became realized. For example, a credit card provider may provide a facility whereby a merchant may submit an Internet request to validate a customer's payment information, such that the merchant may configure an order entry application to automatically verify customer payment information without manual intervention. Similarly, distributors, subcontractors, and other clients may provide ordering and fulfillment interfaces for computer-submitted requests to potentially allow for automation of all phases of a customer transaction, from order entry to fulfillment.

One common model for configuring application services to be accessed by requesting clients is the web services model, in which a client may be configured to request a web service by conveying a message or document including the details of the request to the web service, typically using a web protocol such as Hypertext Transfer Protocol (HTTP). Upon receiving the request, the web service may process the request (e.g., using one or more applications) and may return results to the client or carry out some other action. In typical web service implementations, a provider of a web service may indicate the availability of a given web service by publishing a description (using a protocol such as Web Services Description Language (WSDL), for example) of the web service in a directory (using a protocol such as Universal Description, Discovery and Integration (UDDI), for example). A client desiring to interact with a web service may use such directory and description information to locate the service.

Although the web services model of providing client access to application services is increasingly popular, conventional web services implementations may limit scalability and maintenance of applications. For example, in one conventional embodiment, each client application that desires access to web services must implement its own interface to access and coordinate communication with the desired services, such as by sending an outgoing message from the enterprise to a particular web service. In a complex enterprise where numerous applications are configured to generate outgoing messages to access web services, such an implementation may result in redundant development effort, as the necessary interfaces are coded into each application, as well as long-term scalability and maintenance issues arising from such a decentralized web services interface (such as modifying all applications if the web services interfaces change, for example).

SUMMARY

Various embodiments of a web services message broker architecture are disclosed. In one embodiment, a system may include a server system and a plurality of applications, each configured to implement one or more enterprise functions and to execute on the server system. The system may further include a web services message broker configured to execute on the server system and to present a central web services interface to the plurality of applications, through which a given one of the plurality of applications is configured to communicate with a web service.

In one specific implementation of the system, the web services message broker may be further configured to receive an incoming web service request and to convey the incoming web service request to one of the plurality of applications. In another specific implementation of the system, communicating with the web service may include exchanging a message with a web service entity configured to execute on another server system. In yet another specific implementation of the system, the message exchanged may include a document formatted according to a version of Extensible Markup Language (XML) format.

A method is further contemplated that in one embodiment may include a plurality of applications executing on a server system, where each of the plurality of applications is configured to implement one or more enterprise functions, and a web services message broker executing on the server system. The method may further include the web services message broker presenting a central web services interface to the plurality of applications, and a given one of the plurality of applications communicating with a web service through the central web services interface.

Figure 1:
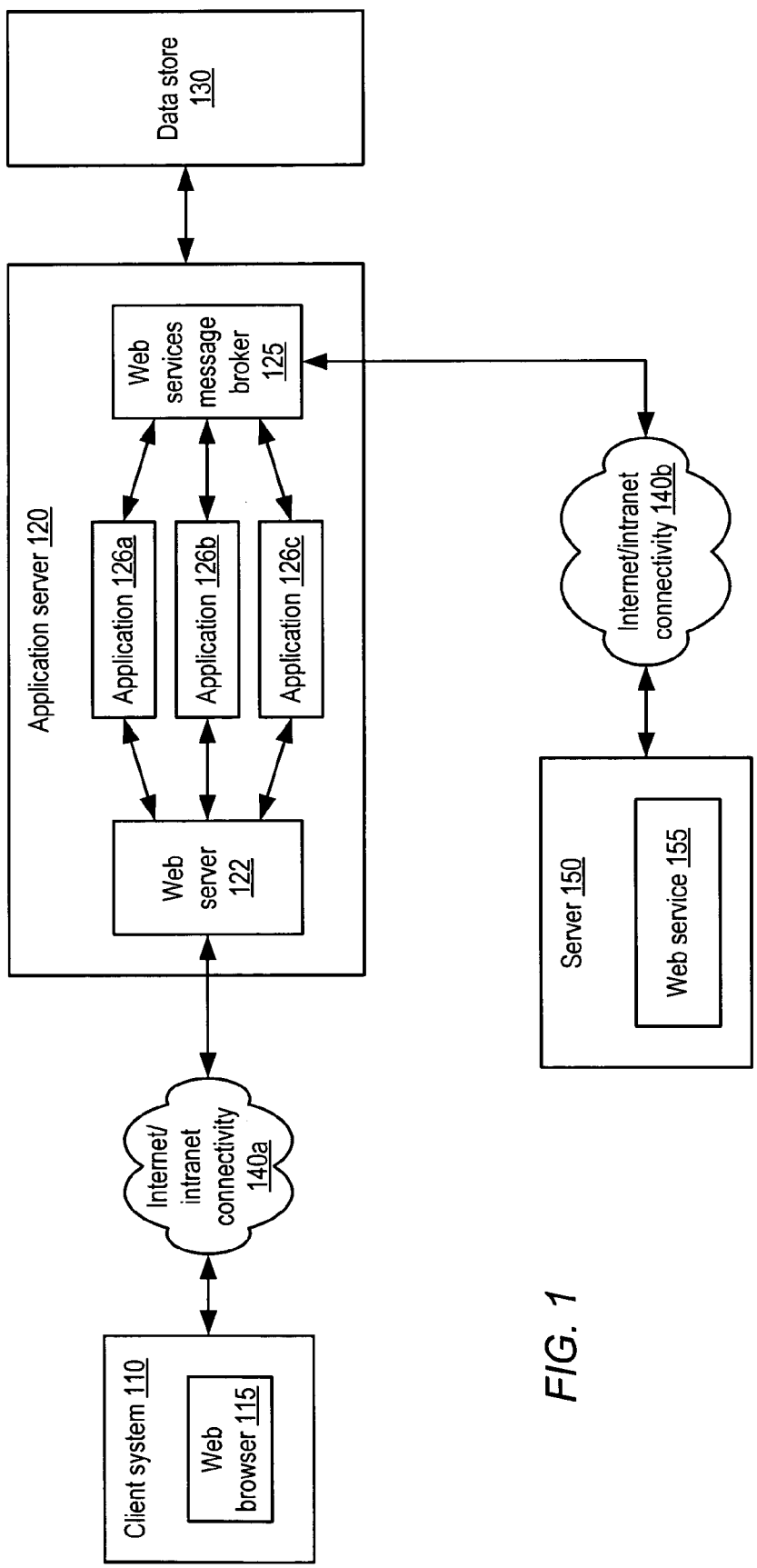
FIG. 1 is a block diagram illustrating one embodiment of a web services system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Web Services System

Broadly speaking, a web services system may be configured to provide users and/or applications executing on one computer system with access to various types of services that may be configured to execute on another computer system. A web service generally may be understood to include any type of computing activity that may be performed on behalf of another application or client, such as in response to a request for service. For example, in one embodiment a web service may be configured to provide a real-time stock quote to a requesting application or client that provides a ticker symbol. In another embodiment, a web service may be configured to process credit card validation and transaction processing on behalf of a number of different vendor applications. In many embodiments, a web services model may be used to flexibly link providers and consumers of services across different enterprises or within a diverse, distributed, and possibly geographically dispersed enterprise.

A block diagram illustrating one embodiment of a web services system is illustrated in FIG. 1. In the illustrated embodiment, a client system 110 is configured to communicate with an application server 120 via internet/intranet connectivity 140a, and application server 120 is configured to communicate with another server 150 via internet/intranet connectivity 140b. (Internet/intranet connectivity 140a-b may also be referred to herein as network 140a-b). Additionally, in the illustrated embodiment application server 120 is configured to communicate directly with data store 130. Client system 110 is configured to host a web browser 115. Application server 120 is configured to host a web server 122, a web services message broker 125 (which may also be referred to herein simply as broker 125) and a plurality of applications 126a-c. Server 150 is configured to host a web service 155.

In the illustrated embodiment, client system 110 may be a computer system configured to initiate a request for application services provided by application server 120. For example, in one embodiment client system 110 may be an individual user's computer system coupled to network 140a via an Ethernet, modem, or other network connection. In such an embodiment, an individual user may initiate a request for application services by interacting with a web page via web browser 115. For example, a user may initiate a web-based purchase order transaction by requesting a relevant form or document from application server 120 via web server 122, entering relevant information into the form via web browser 115, and submitting the form to application server 120 for processing.

Application service requests originating from client system 110 need not be interactively generated in response to a user's request. In some embodiments, such requests may be automatically generated by a process or application executing on client system 110. For example, client system 110 may be configured to automatically generate application service requests in response to various detected conditions or elapsed time intervals, such as automatically placing a purchase order when detected inventory levels fall below a given threshold. Further, application service requests need not be conveyed from client system 110 using a web-based protocol. In some embodiments, alternative mechanisms for client-application server communication may be employed, such as the Common Object Request Broker Architecture (CORBA), for example.

In various embodiments, client system 110 may be any type of computer system capable of interacting with application server 120 via network 140. For example, client system 110 may be a conventional desktop or notebook computer, a handheld computer such as a personal digital assistant (PDA), a thin client, or any other suitable type of computer system. In some embodiments, client system 110 may employ a hardware and/or operating system architecture that is dissimilar from the architecture implemented by application server 120. For example, in one embodiment client system 110 may be based on an x86-compatible hardware architecture running a version of the Windows operating system, while application server 120 may be based on a SPARC hardware architecture running a version of the Solaris, Unix, or Linux operating systems.

Network 140a may be any suitable type of data communication network configured to convey data between client system 110 and application server 120. In various embodiments, network 140a may include local area network (LAN), wide area network (WAN), or telecommunications network functionality, or a combination of these. Network 140a may include devices such as routers, hubs, switches, multiplexers, concentrators, or other network interface devices, and may implement any of a variety of networking protocols such as Ethernet, Token-Ring, Synchronous Optical Network (SONET), or other suitable protocols. Network 140a may be implemented using electrical wire, optical fiber, wireless (e.g., radio frequency) or other interconnect technologies or a combination of these.

Application server 120 may be configured to process requests or transactions for application functionality received from client system 110 via web server 122. For example, application server 120 may implement business logic for processing a purchase order transaction via applications 126, where one application 126a may be configured to manage financial aspects of the purchase order transaction (such as verifying purchasing authority of the requestor, assessing funds availability, etc.) and where another application 126b may be configured to manage logistical aspects of the transaction (such as verifying inventory availability from a supplier, scheduling delivery, etc.). Generally speaking, a given application 126 may be configured to implement one or more specific enterprise functions. Such enterprise functions may include the business logic functions just described, for example, as well as other exemplary functions such as database query functions, communication/notification functions, decision logic, transaction management logic, or any other suitable application function. It is contemplated that in various embodiments, application server 120 may implement an arbitrary number of different types of applications 126 depending, for example, on the specific processing needs of a given enterprise. It is further contemplated that in some embodiments, the program functions represented by applications 126 may be implemented as separate submodules of a single application 126.

In the illustrated embodiment, application server 120 may be configured to interface directly with back-end data store 130. In one embodiment, data store 130 may be configured as a database server including one or more datasets and a query engine configured to evaluate queries against the datasets. For example, data store 130 may be configured to maintain a database including customer identity and order information. While performing a particular enterprise function, a given application 126 may be configured to generate a query to retrieve information stored within the database, such as the status of all orders associated with a particular customer. Data store 130 may be configured to responsively evaluate such queries and return resulting data. In some embodiments, data store 130 may include physical storage such as individual disk drives, drive arrays, or storage devices configured as a Storage Area Network (SAN). In the illustrated embodiment, data store 130 may be privately connected to application server 120 such that data store 130 is not accessible by client system 110 or by other systems. However, in other embodiments it is contemplated that data store may be publicly connected via network 140a or 140b and generally accessible by other systems.

In the course of execution, a given application 126 may need to perform a transaction or access data not available within the scope of application server 120. For example, in an instance where application server 120 implements business logic for a web storefront, one application 126a may be configured to process a user's credit card payment instructions and another application 126b may be configured to interact with an external supplier to coordinate order fulfillment. In one embodiment, such applications 126 may be configured to communicate via network 140b with a particular web service 155 hosted by a server 150 to perform the desired transaction or access the needed data. Referring to the previous example, application 126a may be configured to interact with a credit card validation web service 155 made available by a bank in order to validate a given user's credit card information and to post a charge. Similarly, application 126b may be configured to interact with an order fulfillment web service 155 made available by an external supplier, through which an order for product or reservation for services may be made. It is noted that an arbitrary number of web services 155 may be accessible to applications 126, and an arbitrary number of servers 150 may be provided to host web services 155. In various embodiments, server 150 may be any type of computer system suitable for hosting associated web service 155. For example, in one embodiment server 150 may be configured similarly to application server 120. In various embodiments, network 140b may be configured similarly to network 140a described above, and in one embodiment, network 140a and network 140b may be part of the same network (i.e., may overlap such that nodes connected to either network instance may directly or indirectly communicate).

In a complex enterprise, numerous applications 126 may need access to various web services 155. Additionally, in some embodiments, any of applications 126 may function as a web service on behalf of other applications external to application server 120. That is, a given application 126 may respond to requests for web services in addition to or instead of originating such requests. Rather than implementing a web services interface within each application 126 that may originate or service web service requests, which may result in inefficient replication of code and difficulty in maintaining and scaling applications 126, in the illustrated embodiment broker 125 is configured to provide a central web services interface to applications 126, as described in greater detail below. In one embodiment, broker 125 may be configured to centralize both incoming (i.e., originating externally to application server 120) and outgoing web services communication.

It is noted that although client system 110, application server 120 and data store 130 have been illustrated as distinct entities (sometimes referred to as a "three-tier architecture"), it is contemplated that in other embodiments, some or all of the functions of these elements may be consolidated into fewer systems or even a single system. For example, in some embodiments data store 130 may be omitted or integrated into application server 120. Also, in some embodiments such as ultra-thin-client systems (e.g., Sun Ray systems), client system 110 may be replaced by a client configured to perform only minimal input and display functionality, and application server 120 may be configured to execute client-system functions such as web browser 115 on behalf of a given user in addition to executing applications 126. It is further noted that in various embodiments, an arbitrary number of client systems 110, application servers 120, data stores 130, and/or servers 150 may be provided.

Additionally, other configurations of applications and processes within application server 120 are possible and contemplated. For example, in some embodiments, application server 120 may be configured to provide distinct environments for application execution. Such environments may also be referred to as "containers" and may function at different levels of software abstraction. For example, in one embodiment application server 120 may be configured to provide a web container in which web server 122 executes, and an application container such as an Enterprise JavaBeans (EJB) container in which applications 126 and broker 125 execute. In other embodiments, different numbers and types of containers may be provided, and applications and other processes may be differently partitioned among them. For example, in some embodiments, web server 122 may be configured to execute on a server distinct from application server 120.

Although only the web services functionality hosted by server 150 on behalf of application server 120 is shown to improve clarity, in some embodiments, server 150 may be configured as an application server within a single- or multiple-tier architecture of its own. For example, in one embodiment server 150 may be provisioned within a distinct enterprise in a capacity analogous to that of application server 120, such that server 150 may host its own applications on behalf of one or more client systems analogous to client systems 110. In such an embodiment, server 150 may also be configured to interface with its own back-end data store analogous to data store 130. In some embodiments, server 150 may be configured to communicate with one or more of applications 126 as web services, such that each of application server 120 and server 150 may provide certain web services to the other in a roughly symmetric fashion. The methods and techniques of broker 125 described below may thus be similarly applicable to some embodiments of server 150.

Broker Architecture and Functionality

In some embodiments, broker 125 may be configured to coordinate message- or document-based communications among applications 126 and web service 155. Specifically, in one embodiment the messages exchanged among these entities may include documents formatted according to a version of the Extensible Markup Language (XML) data format (i.e., XML documents). Generally speaking, XML documents may be self-describing documents that include both data fields and corresponding tag fields that delimit and describe data fields.

Figure 2:
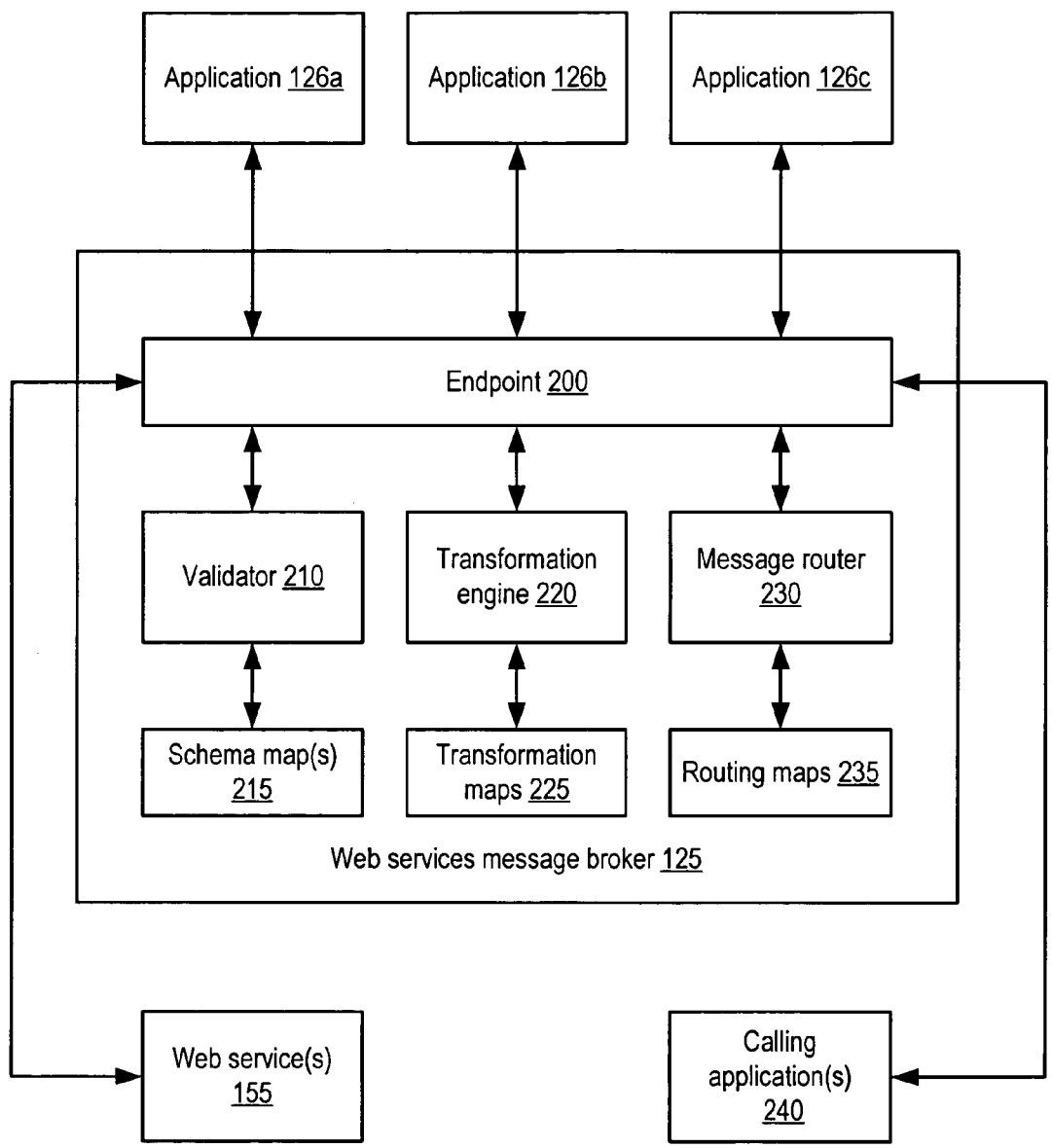
FIG. 2 is a block diagram illustrating one embodiment of a web services message broker.

One embodiment of broker 125 configured to present a central web services interface to applications 126 is illustrated in FIG. 2. In the illustrated embodiment, broker 125 is configured to interact with applications 126a-c as well as one or more web services 155 and one or more calling applications 240. (Although some of these entities may be configured to execute on particular systems and to communicate via specific networking infrastructure as illustrated in FIG. 1, these details are omitted from FIG. 2 for clarity.) Additionally, in the illustrated embodiment broker 125 includes an endpoint 200 configured to interact with a validator 210, a transformation engine 220, and a message router 230. Respectively, these entities in turn reference one or more schema maps 215, transformation maps 225, and routing maps 235.

In one embodiment, endpoint 200 may be configured to present the primary addressable interface of broker 125 to applications 126 that are local to broker 125 as well as to remote web services 155 and calling applications 240. For example, endpoint 200 may present method interfaces of broker 125 that may be invoked by a particular application 126 that desires to initiate a web service call to web service 155. Additionally, endpoint 200 may present a remotely addressable service name such as a Uniform Resource Indicator (URI) that may be referenced by a remote client, such as calling application 240, requesting access to a web service provided by one of applications 126. In some embodiments, endpoint 200 may be implemented in a Java programming environment using the Java Application Programming Interface for XML-Based Remote Procedure Calls (JAX-RPC) technology, while in other embodiments endpoint 200 may be implemented using Enterprise JavaBeans or another suitable technology.

A given application 126 may be configured to initiate a web services request in one embodiment by conveying an XML document including information specific to the request to broker 125. Such a document may also be referred to as a web services request document. In one embodiment, given application 126 may convey a web services request document to broker 125 via endpoint 200, although it is contemplated that in other embodiments, applications 126 may use any suitable distributed communications technology to communicate with broker 125. For example, applications 126 may utilize a Java Message Service (JMS) queue or a remote Enterprise JavaBean (EJB) for communication with broker 125.

As an example of web services request initiation, an application 126 seeking to validate credit card information for a given purchase order transaction may assemble an XML-format web services request document including information such as the credit card number, expiration date, the name of the credit card holder, the transaction amount, and the identity of the payee. In one embodiment, application 126 may also embed within the XML document the name (e.g., the URI) of the specific web service 155 associated with the desired web service. For example, if the URI of the credit card validation web service were "http://www.bigbank.com/services/ccvalidate", application 126 may include this information within its request document. In another embodiment, broker 125 may be configured to exchange documents formatted using a version of the Simple Object Access Protocol (SOAP), which allows XML document metadata to be readily distinguished from document contents. In such embodiments, the application 126 may place the web service URI in a SOAP header field.

In various embodiments, other information about a particular web service request besides the name of the requested web service may be provided by application 126. For example, a given web service request may require higher-priority processing than the default level of priority. Alternatively, security information such as encryption or authentication information may need to be included with the request. Such additional information may be embedded within an XML document or a SOAP header by a requesting application 126. In an alternative embodiment, application 126 may qualitatively indicate the desired web service and/or any additional information regarding the request (e.g. priority information, security requirements, etc.) to broker 125 while making the request. For example, in such an embodiment an application 126 may pass a service-identifying parameter "ccvalidate" to broker 125 along with an XML document including details of the validation request. Subsequently, broker 125 may be configured to resolve that parameter to a specific URI of the requested web service, and may also translate or reformat the provided XML document to include any necessary additional data or metadata as described below.

Once broker 125 receives a web services request document from a particular application 126, it may be configured to convey the document to the requested web service 155. For example, in one embodiment broker 125 may be configured to convey the document to the URI of the requested web service 155 using a Hypertext Transfer Protocol (HTTP) command. However, in some embodiments the web service request document generated by application 126 may be translated and/or validated before it is conveyed to the requested web service 155. For example, in some instances web service 155 may be configured to expect document data fields to be formatted, tagged, or structured in a manner that differs from the document produced by a requesting application 126. Also, in some instances a document that is malformed (i.e., syntactically incorrect, missing information essential to the requested web service 155, etc.) may create undesirable consequences if it is submitted to and processed by a web service 155.

In the illustrated embodiment, broker 125 includes transformation engine 220, which may be configured to apply necessary transformations to a web services request document before the document is conveyed to a requested web service 155. In one embodiment, transformation engine 220 may be configured to detect the destination web service of a given document (e.g., the credit card validation web service) as well as the type of a given document (e.g., purchase transaction, refund transaction, credit-hold transaction). For example, transformation engine 220 may examine information embedded in data fields within the document body or within document metadata as described above. Subsequently, transformation engine 220 may reference transformation maps 225 to determine what (if any) features of the request document need to be transformed prior to sending the document. In one embodiment, transformation maps 225 may include tables or other data structures corresponding to known web services 155 and document types, which data structures specify mappings between formatting employed by applications 126 and web services 155. In some embodiments, such mappings may encompass the document data itself, the tags delimiting the document data, the structure of the document (e.g., the hierarchical relationship of data fields), or a combination of these or other document features.

For example, a credit card validation web service 155 may expect a credit card expiration date to be included with the credit card number in a record formatted as follows:

. . .

<ccinfo>
<ccnumber>digits</ccnumber>
<ccexp>MMYY</ccexp>
</ccinfo>

. . .

where the date is a four-digit string and the tags used to delimit the data are as shown. (The request document may of course include other information; only those portions relevant to this example are shown.) In contrast, a requesting application 126 may use a delimiter to separate the month and year of the expiration date, and may use different tags and record structure, such as:

```
...
<card_number>digits</card_number>
<card_exp>MM/YY</card_exp>
...
```

In one embodiment, transformation maps 225 may include the information necessary to allow transformation engine 220 to translate the latter format to the former, such as by removing the "/" character from the expiration date, renaming the tags, and restructuring the document hierarchy. Numerous other types of transformations are possible and contemplated, and it is further contemplated that in various embodiments an arbitrary number of transformation maps 225 may be defined.

In the illustrated embodiment, broker 125 also includes validator 210. In one embodiment, validator 210 may be configured to determine whether a given web services request document is properly formed or malformed by checking the document against a corresponding one of schema maps 215. In one embodiment, a schema map 215 may be an abstract representation of the structure of a document, such as a template. In various embodiments, schema map 215 may indicate that certain data fields should or should not be present within a document, that certain data fields should be tagged in a particular way, that the document conform to a particular structure (e.g., a particular hierarchical relationship of data fields). Additionally, a schema map 215 may provide a basis for evaluating any other textual aspect or combination of aspects of a document.

As an example, in one embodiment a validator 210 may be configured use an appropriate schema map 215 to check a web services request document destined for a credit card verification web service to ensure that both a credit card number and expiration date are provided and that the expiration date is a valid date. Numerous other types of schema-based document checks are possible and contemplated. In various embodiments, an arbitrary number of schema maps 215 may be defined. For example, a schema map 215 may be defined for each type of document handled by a particular web service 255, or only for a subset of such document types. Also, in various embodiments where a web service request document may be transformed by transformation engine 220 prior to conveying the document to web service 255, validator 210 may be configured to apply a schema map 215 to the document either before or after transformation, both before and after transformation, or not at all.

As noted above, in some embodiments web services communication through broker 125 may be bidirectional. For example, a web service 255 may return a response (such as a document) to a request originated by an application 126. Also, in some embodiments one or more external applications such as calling application(s) 240 may be configured to convey web service request documents to one or more of applications 126 (though it is noted that broker 125 need not be implemented on the system hosting a calling application 240). In either case, endpoint 200 may be configured to receive documents that may correspond to web service requests or responses. For example, endpoint 200 may be configured to receive HTTP message traffic directed to URIs corresponding to the various applications 126.

Like outgoing web service request documents, in some embodiments incoming documents may also need to be validated and/or transformed into a format suitable for use by one or more of applications 126. In some such embodiments, validator 210 and transformation engine 220 may be invoked by broker 125 to process incoming documents in a manner similar to that described above for outgoing documents. For example, in response to a credit card purchase transaction request submitted in a previous web services document, a credit card validation web service 255 may return a document that includes a transaction identifier and an approval code. In one embodiment, validator 210 may be configured to employ an appropriate schema map 215 to ensure that the returned document includes the expected fields, and transformation engine 220 may be configured to employ an appropriate transformation map 225 to rename tags used in the document to values expected by requesting application 126.

Once an incoming web service request document is received by broker 125 (which document may be either an initial web services request originating from a calling application 240, or a response from a web service 155 to a previous request initiated by an application 126) and processed by validator 210 and transformation engine 220 if necessary, the incoming document may be routed to a particular application 126 for further processing. In the illustrated embodiment, broker 125 includes message router 230, which may be configured to consult routing maps 235 to determine the destination application 126 for a given incoming document. For example, a calling application 240 may submit a web services request to a particular URI that references endpoint 200. Routing maps 235 may be configured to store a mapping from the requested URI to a particular application 126. Using this mapping, message router 230 may direct the message appropriately. In some embodiments, when an application 126 prepares a web service request document, it may include an indication of its own identity within the document. In some such embodiments, when web service 155 returns a result document, it may preserve the application identity indicated in the request, so that message router 230 may use the indication to route the result document to the original requesting application 126.

In various embodiments, incoming documents may be routed directly to their corresponding applications 126, or they may be buffered or queued. For example, in one embodiment one or more Java Message Service (JMS) queues may be configured to queue and deliver incoming documents to applications 126. In other embodiments, EJB method calls or web services calls may be used by broker 125 to convey incoming documents to applications 126. In some embodiments, a combination of such techniques may be employed.

As noted previously, in some embodiments an application 126 that generates a web services request document may know the exact URI of the web service 155 it is requesting, and may convey this information to broker 125 within the request document data, metadata, as a parameter of a method call, or via other means. In such an embodiment, broker 125 may be configured to convey the request document to web service 155 without further processing the specified URI. In other embodiments, application 126 may not include the exact URI of the requested web service 155, but may indirectly identify the requested service such as with a pseudonym. In some such embodiments, message router 230 may also be configured to translate the web service indication supplied by application 126 to an actual URI corresponding to requested web service 155. For example, routing maps 235 may include an entry matching the pseudonym "ccvalidate" to the URI "http://www.bigbank.com/services/ccvalidate". In some such embodiments, if web service URIs change, routing maps 235 may be updated without changing the mechanism used by applications 126 to specify requested web services.

Over time, it is possible that not just web service URIs but also the types of web service documents exchanged by broker 125 may change. A given web service 155 may change the functionality it provides and consequently change how functionality is to be requested via a web service request document. For example, a credit card validation web service 155 may add support for biometric or hardware-based security information, defining one or more tagged data fields with which to convey such information. Additionally, new web services 155 may be added over time, which may define new document types specific to the service provided. It is contemplated that in some embodiments, rather than providing a specific message-receiving method interface within endpoint 200 for each conceivable document type, broker 125 may be configured to generically receive documents of any type. In such embodiments, broker 125 may determine how to route a given document for processing based on the document contents, such as whether a document conforms to a particular schema map 115, rather than what method of endpoint 200 was invoked to receive the given document.

It is possible that, in some embodiments, a given web service request made by a calling application 240 may involve processing by not just one, but several applications 126. For example, in one embodiment application server 120 may be configured to provide order fulfillment web services on behalf of requesting applications. In such an embodiment, a calling application 240 may make a single web services request by conveying a document that includes order details as well as payment information. Application server 120 may provide one application 126*a* to process payment details while providing another application 126*b* to facilitate order assembly and delivery. (It is contemplated that in performing these activities, applications 126*a-b* may generate additional web service calls in some embodiments.)

In some embodiments where a single web services request may correspond to several applications 126, broker 125 may be configured to split or copy the incoming web services request document prior to conveying the portions or copies to the relevant applications 126. For example, in one embodiment message router 230 may be configured to direct a copy of the received request document to each of several applications 126 as indicated by routing maps 235. In another embodiment, transformation engine 220 may be configured to split the received request document into several documents, which message router 230 may subsequently convey to their respective applications 126. For example, transformation engine 220 may consult transformation maps 225 to extract payment information into one document and order details into a second document.

When incoming web services requests are distributed among multiple applications 126 for servicing, in some embodiments broker 125 may also be configured to facilitate tracking the relationship of the distributed application activity to the original request. Referring to the order fulfillment example, an order fulfillment web services request that is divided among several applications 126 may not be considered complete until each application 126 completes its relevant portion (i.e., the request may be transactional). Correspondingly, in one embodiment broker 125 may be configured to facilitate the processing of transactional web service requests by identifying each document generated from the request (e.g., by splitting or copying) as part of a single transaction. For example, transformation engine 220 or message router 230 may be configured to embed the same unique identifier (such as an alphanumeric string) in each generated document that corresponds to a single web service request document. Such a unique identifier may also be referred to as a correlation identifier or correlation ID.

Figure 3:
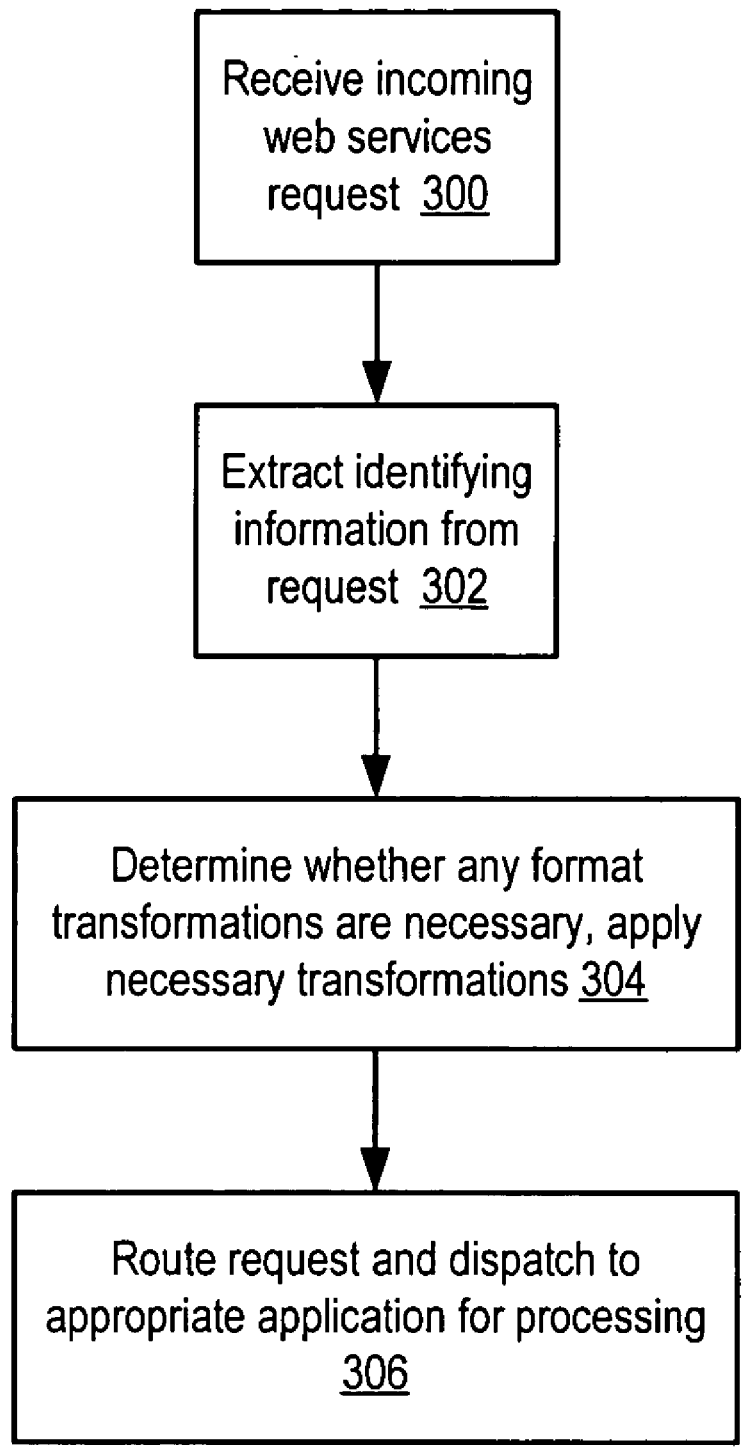
FIG. 3 is a flow diagram illustrating one embodiment of a method of processing incoming web services message traffic.

One embodiment of a method of processing incoming web services message traffic, such as may be implemented by broker 125, is illustrated in FIG. 3. Referring collectively to FIG. 1 through FIG. 3, operation begins in block 300 where broker 125 receives an incoming web services request, for example as an HTTP message from a calling application 240. In some embodiments, the web services request may be represented as an XML document as previously described.

After the request has been received, identifying information is extracted from the request (block 302). For example, metadata identifying the type of the request, document version or other salient information may be embedded within the body of a request document, within a SOAP header encapsulating the document, or may be otherwise conveyed with the request.

Based on the identifying information corresponding to the request, broker 125 then determines whether any format transformations are necessary and applies necessary transformations (block 304). For example, in one embodiment transformation engine 220 may be configured to identify and apply format transformations as described above. Additionally, in some embodiments such transformations may include splitting or copying the received request into multiple request documents. Also, in some embodiments the received request may be validated by validator 210 before or after any necessary transformations have been applied.

Following format transformations (if any were applied), broker 125 then routes the request and dispatches it to the appropriate application 126 for processing (block 306). For example, in one embodiment message router 230 may be configured to route incoming requests according to mappings defined within routing maps 235. In embodiments where an incoming request may be transformed into multiple documents, each document may be separately routed to a respective application 126.

Figure 4:
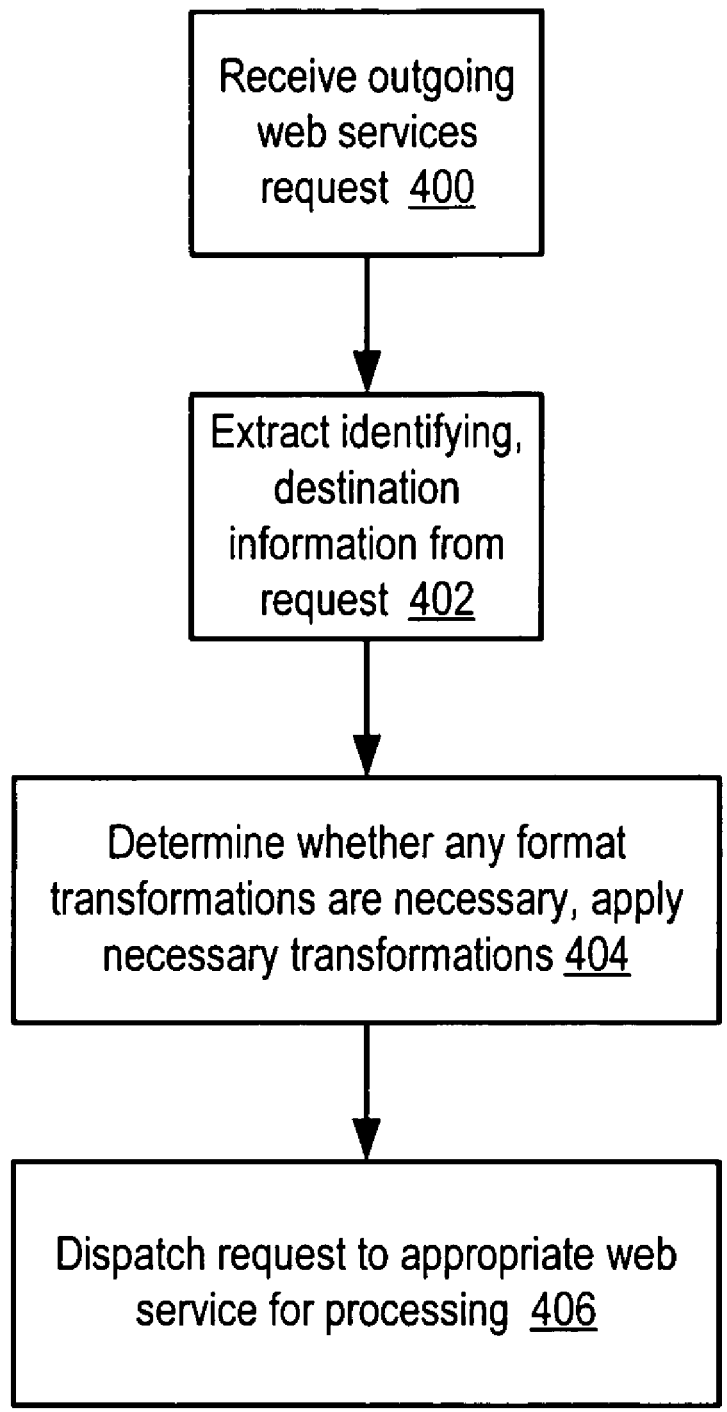
FIG. 4 is a flow diagram illustrating one embodiment of a method of processing outgoing web services message traffic.

One embodiment of a method of processing outgoing web services message traffic, such as may be implemented by broker 125, is illustrated in FIG. 4. Referring collectively to FIG. 1, FIG. 2 and FIG. 4, operation begins in block 400 where broker 125 receives an outgoing web services request, for example as an invocation of a method of endpoint 200 by a requesting application 126. In some embodiments, the web services request may be represented as an XML document as previously described.

After the request has been received, identifying and destination information is extracted from the request (block 402). For example, the requesting application 126 may embed a specific URI of the requested web service 155 within the body of a request document or within a SOAP header encapsulating the document, or may otherwise convey such destination information with the request. Additional document data or metadata may be included to identify the type of the request or any other salient feature. In some embodiments, it is contemplated that broker 125 may be configured to map destination information provided by requesting application 126 to a URI of the requested web service 155.

Based on the destination and/or identifying information corresponding to the request, broker 125 then determines whether any format transformations are necessary and applies necessary transformations (block 404). For example, in one embodiment transformation engine 220 may be configured to identify and apply format transformations as described above. Also, in some embodiments the received request may be validated by validator 210 before or after any necessary transformations have been applied.

Following format transformations (if any were applied), broker 125 then dispatches the web services request to the appropriate web service 155 for processing (block 406). For example, broker 125 may be configured to convey an XML document including the web services request to a corresponding web service 155 via an HTTP operation.

Exemplary Server System

Figure 5:
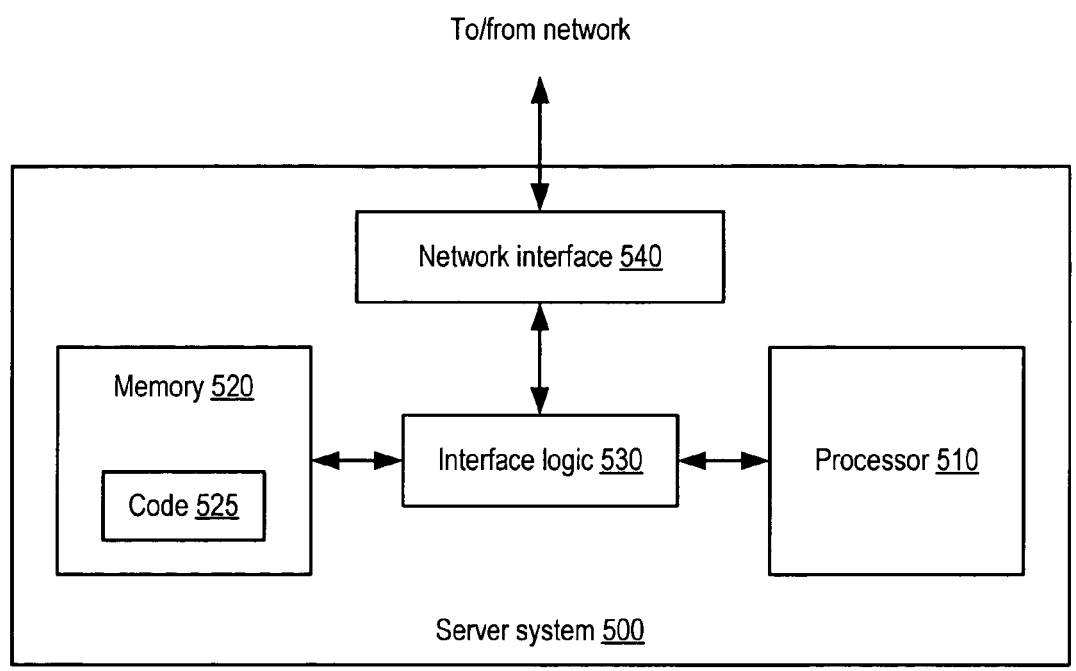
FIG. 5 is a block diagram illustrating an exemplary server system embodiment.

One embodiment of an exemplary server system that may be illustrative of application server 120 or server 150 is shown in FIG. 5. In the illustrated embodiment, server system 500 includes a processor 510 coupled to a memory 520 via interface logic 530. Also, network interface 540 is coupled to processor 510 and memory 520 via interface logic 530. In one embodiment, server system 500 may be configured to execute any of the software functions, methods or techniques illustrated within application server 120 or server 150 and described above. In some embodiments, server system 500 may also be configured to execute the functions, methods or techniques of client system 110 or data store 130 of FIG. 1.

Processor 510 may be configured to execute program instructions stored in memory 520 or received via network interface 540. In one embodiment, processor 510 may be a microprocessor configured to implement a given instruction set architecture (ISA), such as the SPARC ISA or the x86 ISA, for example. In another embodiment, processor 510 may be a digital signal processor, while in still another embodiment, processor 510 may be an integrated device such as a microcontroller, an Application Specific Integrated Circuit, or a Field Programmable Gate Array (FPGA). In some embodiments, processor 510 may include an integrated memory controller (not shown) enabling it to couple directly to memory such as memory 520, whereas in other embodiments, processor 510 may couple to memory via an interface separate from interface logic 530, such as a dedicated north bridge.

Memory 520 may be configured to store program instructions and data during operation of server system 500. In various embodiments, memory 520 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or Rambus DRAM (RDRAM), for example. Memory 520 may also include nonvolatile memory technologies such as nonvolatile "flash" RAM (NVRAM) or read-only memory (ROM). In some embodiments, it is contemplated that memory 520 may include a combination of technologies such as the foregoing, as well as other technologies not specifically mentioned. In the illustrated embodiment, memory 520 includes software code 525, which may include program instructions and data corresponding to one or more of broker 125, applications 126, or web service 155 illustrated in FIG. 1. Code 525 may also include program instructions and data corresponding to other application or operating system software modules. For example, code 525 may include program instructions and data corresponding to a version of the Solaris, Unix, Linux, Microsoft Windows or other suitable operating systems, and/or to one or more applications configured to execute within an environment provided by such an operating system.

Interface logic 530 may be configured to interface various peripheral devices, such as network interface 540, to processor 510 and to memory 520. In one embodiment interface logic 530 may include logic and interconnect devices configured to implement a bus interconnect standard such as the peripheral component interconnect (PCI) bus standard, although in other embodiments other bus interconnect types or a combination of such types may be supported. In some embodiments, interface logic 530 may include logic configured to support direct memory access (DMA) transfers between peripheral devices and memory 520.

Network interface 540 may be configured to transmit data from server system 500 to other computer systems as well as to receive data from other computer systems via a communication network. In one embodiment, network interface device 540 may be physically coupled to one or more other computer systems and may implement a networking standard such as Ethernet, for example. Alternatively, network interface device 540 may implement a fiber optic communication network protocol, or it may implement a telephony protocol and function as a dial-up modem, for example. In another embodiment, network interface device 540 may use a wireless networking protocol to interface with one or more other computer systems, such as a wireless Ethernet protocol (e.g., Wi-Fi), the Bluetooth standard, or a wireless telephony standard. In some embodiments, it is contemplated that network interface device 540 may include more than one network interface implementing more than one type of interface protocol, including other types of devices and protocols.

In some embodiments, server system 500 may be configured to include other embodiments not shown. For example, server system 500 may include one or more mass storage devices such as hard disk drives, optical drives (e.g., CD or DVD-based drives), or solid-state storage devices (e.g., NVRAM-based devices) that may be coupled to interface logic 530 via a variety of interfaces, such as the Small Computer System Interface (SCSI), AT Attachment Peripheral Interface (ATAPI), IEEE 1394 (Firewire), Universal Serial Bus (USB), or another suitable interface. Server system 500 may also include input and output devices such as keyboards, computer mice, graphic displays and associated graphics hardware, or any other suitable peripheral devices.

As noted above, in some embodiments code 525 may correspond to one or more of the software modules illustrated in FIG. 1, such as broker 125, applications 126, web service 155, and/or web server 122. In the illustrated embodiment of server system 500, code 525 resides in memory 520. Memory 520 may be one embodiment of a computer-accessible medium configured to store program instructions and/or data such as included in code 525. However, in other embodiments, the program instructions and/or data included in code 525 may be received, sent or stored upon different types of computer-accessible media. Generally speaking, a computer-accessible medium may include storage media or memory media such as magnetic or optical media, e.g., disk or CD-ROM included in some embodiments of server system 500 as one or more mass storage devices, as mentioned above. A computer-accessible medium may also include volatile or non-volatile media such as RAM (e.g. SDRAM, DDR SDRAM, RDRAM, SRAM, etc.), ROM, etc, such as memory 520 as previously described. Further, a computer-accessible medium may include transmission media or signals such as electrical, electromagnetic, or digital signals, conveyed via a communication medium such as network and/or a wireless link, such as may be implemented by network interface 540.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a server system;

a plurality of applications, each configured to implement one or more enterprise functions and to execute on said server system; and a web services message broker configured to execute on said server system and to present a central web services interface to said plurality of applications, wherein said central web services interface comprises a web services endpoint executable to provide a remotely addressable service name to calling applications external to said server system;

wherein said web services message broker is executable to receive an outgoing web services request from a given one of said plurality of applications on said server system, wherein said outgoing web services request does not specify an exact Uniform Resource Indicator (URI) of a corresponding requested web service and wherein said web services message broker is further executable to determine said exact URI of said requested web service and to dispatch said outgoing web services request to said requested web service via said exact URI; and wherein said web services message broker is further executable to receive via said web services endpoint, an incoming web services request directed to said remotely addressable service name by a given one of said calling applications external to said server system, and wherein said web services message broker is further executable to dispatch said incoming web services request to a corresponding one or more of said applications on said server system dependent upon identifying information included in said incoming web services request.

2. The system as recited in claim 1, wherein to dispatch said outgoing web services request to said requested web service said web services message broker is further configured to exchange a message with a web service entity configured to execute on another server system.

3. The system as recited in claim 2, wherein said message comprises a document formatted according to a version of Extensible Markup Language (XML) format.

4. The system as recited in claim 2, wherein said message is formatted according to a version of Simple Object Access Protocol (SOAP).

5. The system as recited in claim 1, wherein said web services message broker is further configured to send and receive messages using Hypertext Transfer Protocol (HTTP).

6. The system as recited in claim 1, wherein said web services message broker is further configured to publish a description of said remotely addressable service name according to Web Services Description Language (WSDL) protocol.

7. The system as recited in claim 1, wherein said incoming web services request has an associated document type, wherein said web services message broker is configured to provide a generic interface through which to receive said incoming web services request, and wherein said web services message broker is further configured to receive said incoming web services request independently of said associated document type.

8. The system as recited in claim 1, wherein said web services message broker is further configured to split or duplicate said incoming web services request into multiple messages and to convey each of said multiple messages to one or more of said plurality of applications.

9. The system as recited in claim 8, wherein said web services message broker is further configured to insert a correlation identifier corresponding to said incoming web services request into each of said multiple messages.

10. The system as recited in claim 1, wherein said web services message broker is further configured to translate a first message format used by said given application to or from a second message format used by said requested web service.

11. The system as recited in claim 3, wherein said web services message broker is further configured to check said document according to an XML document schema map.

12. A method, comprising:
a plurality of applications executing on a server system, wherein each of said plurality of applications is configured to implement one or more enterprise functions;
a web services message broker executing on said server system;
said web services message broker presenting a central web services interface to said plurality of applications;
said web services message broker receiving an outgoing web services request from a given one of said plurality of applications, wherein said outgoing web services request does not specify an exact Uniform Resource Indicator (URI) of a corresponding requested web service;
said web services message broker determining said exact URI of said requested web service and dispatching said outgoing web services request to said requested web service via said exact URI;
said web services message broker receiving, via a web services endpoint providing a remotely addressable service name to calling applications external to said server system, an incoming web services request directed to said remotely addressable service name by a given one of said calling applications; and
said web services message broker dispatching said incoming web services request to a corresponding one or more of said applications dependent upon identifying information included in said incoming web services request.

13. The method as recited in claim 12, wherein said web services message broker dispatching said outgoing web services request to said requested web service comprises exchanging a message with a web service entity configured to execute on another server system.

14. The method as recited in claim 13, wherein said message comprises a document formatted according to a version of Extensible Markup Language (XML) format.

15. The method as recited in claim 13, wherein said message is formatted according to a version of Simple Object Access Protocol (SOAP).

16. The method as recited in claim 12, further comprising said web services message broker sending and receiving messages using Hypertext Transfer Protocol (HTTP).

17. The method as recited in claim 12, further comprising:
said web services message broker publishing a description of said remotely addressable service name according to Web Services Description Language (WSDL) protocol.

18. The method as recited in claim 12, wherein said incoming web services request has an associated document type, the method further comprising said web services message broker receiving said incoming web service request via a generic interface independently of said associated document type.

19. The method as recited in claim 12, further comprising:
said web services message broker splitting or duplicating said incoming web services request into multiple messages; and
said web services message broker conveying each of said multiple messages to one or more of said plurality of applications.

20. The method as recited in claim 19, further comprising said web services message broker inserting a correlation identifier corresponding to said incoming web service request into each of said multiple messages.

21. The method as recited in claim 12, further comprising said web services message broker translating a first message format used by said given application to or from a second message format used by said requested web service.

22. The method as recited in claim 14, further comprising said web services message broker checking said document according to an XML document schema map.

23. A computer-accessible storage medium storing program instructions, wherein the program instructions are executable to implement:
   a plurality of applications executing on a server system, wherein each of said plurality of applications is configured to implement one or more enterprise functions;
   a web services message broker executing on said server system;
   said web services message broker presenting a central web services interface to said plurality of applications;
   said web services message broker receiving an outgoing web services request from a given one of said plurality of applications, wherein said outgoing web services request does not specify an exact Uniform Resource Indicator (URI) of a corresponding requested web service;
   said web services message broker determining said exact URI of said requested web service and dispatching said outgoing web services request to said requested web service via said exact URI;
   said web services message broker receiving, via a web services endpoint providing a remotely addressable service name to calling applications external to said server system, an incoming web services request directed to said remotely addressable service name by a given one of said calling applications; and
   said web services message broker dispatching said incoming web services request to a corresponding one or more of said applications dependent upon identifying information included in said incoming web services request.

24. The computer-accessible storage medium as recited in claim 23, wherein said web services message broker dispatching said outgoing web services request to said requested web service comprises exchanging a message with a web service entity configured to execute on another server system.

25. The computer-accessible storage medium as recited in claim 24, wherein said message comprises a document formatted according to a version of Extensible Markup Language (XML) format.

26. The computer-accessible storage medium as recited in claim 24, wherein said message is formatted according to a version of Simple Object Access Protocol (SOAP).

27. The computer-accessible storage medium as recited in claim 23, wherein said program instructions are further executable to implement said web services message broker sending and receiving messages using Hypertext Transfer Protocol (HTTP).

28. The computer-accessible storage medium as recited in claim 23, wherein said program instructions are further executable to implement:
   said web services message broker publishing a description of said remotely addressable service name according to Web Services Description Language (WSDL) protocol.

29. The computer-accessible storage medium as recited in claim 23, wherein said incoming web service request has an associated document type, and wherein said program instructions are further executable to implement said web services message broker receiving said incoming web services request via a generic interface independently of said associated document type.

30. The computer-accessible storage medium as recited in claim 23, wherein said program instructions are further executable to implement:
   said web services message broker splitting or duplicating said incoming web services request into multiple messages; and
   said web services message broker conveying each of said multiple messages to one or more of said plurality of applications.

31. The computer-accessible storage medium as recited in claim 30, wherein said program instructions are further executable to implement said web services message broker inserting a correlation identifier corresponding to said incoming web service request into each of said multiple messages.

32. The computer-accessible storage medium as recited in claim 23, wherein said program instructions are further executable to implement said web services message broker translating a first message format used by said given application to or from a second message format used by said requested web service.

33. The computer-accessible storage medium as recited in claim 25, wherein said program instructions are further executable to implement said web services message broker checking said document according to an XML document schema map.

* * * * *

UNITED STATES PATENT AND TRADEMARK OFFICE
CERTIFICATE OF CORRECTION

Page 1 of 2

PATENT NO. : 7,702,724 B1
APPLICATION NO. : 10/854885
DATED : April 20, 2010
INVENTOR(S) : Sean P. Brydon et al.

It is certified that error appears in the above-identified patent and that said Letters Patent is hereby corrected as shown below:

On the title page, item (56), in column 2, under "Other Publications", line 2, delete "http://searcwebservices.techtarget.com/sDefinition/" and insert
-- http://searchwebservices.techtarget.com/sDefinition/ --, therefor.

On the title page, item (56), in column 2, under "Other Publications", line 4, delete "Search WebServices.com" and insert -- SearchWebServices.com --, therefor.

On the title page, item (56), in column 2, under "Other Publications", line 5, delete "searcwebservices.techtarget.com/sDefinition/" and insert
-- searchwebservices.techtarget.com/sDefinition/ --, therefor.

On the title page, item (56), in column 2, under "Other Publications", line 7, delete "Search WebServices.com" and insert -- SearchWebServices.com --, therefor.

On the title page, item (56), in column 2, under "Other Publications", line 8, delete "searcwebservices.techtarget.com/originalcontent/" and insert
-- searchwebservices.techtarget.com/originalcontent/ --, therefor.

On the title page, item (56), in column 2, under "Other Publications", line 11, delete "searcwebservices.techtarget.com/tip/" and insert -- searchwebservices.techtarget.com/tip/ --, therefor.

On page 2, in column 1, under "Other Publications", line 2, delete "http://searcwebservices.techtarget.com/tip/" and insert
-- http://searchwebservices.techtarget.com/tip/" --, therefor.

On page 2, in column 1, under "Other Publications", line 5, delete "searcwebservices.techtarget.com/tip/" and insert -- searchwebservices.techtarget.com/tip/ --, therefor.

Signed and Sealed this
Nineteenth Day of April, 2011

David J. Kappos
*Director of the United States Patent and Trademark Office*

CERTIFICATE OF CORRECTION (continued)
U.S. Pat. No. 7,702,724 B1

On page 2, in column 2, under "Other Publications", line 1, delete ""We" and insert -- "Web --, therefor.

In column 15, line 16, in claim 1, delete "service" and insert -- service, --, therefor.

In column 15, line 22, in claim 1, delete "receive" and insert -- receive, --, therefor.

In column 15, line 32, in claim 2, delete "service" and insert -- service, --, therefor.